March 3, 1959   J. V. FREDD   2,875,525
PIPE LINE CALIPER
Filed Feb. 17, 1956   10 Sheets-Sheet 1
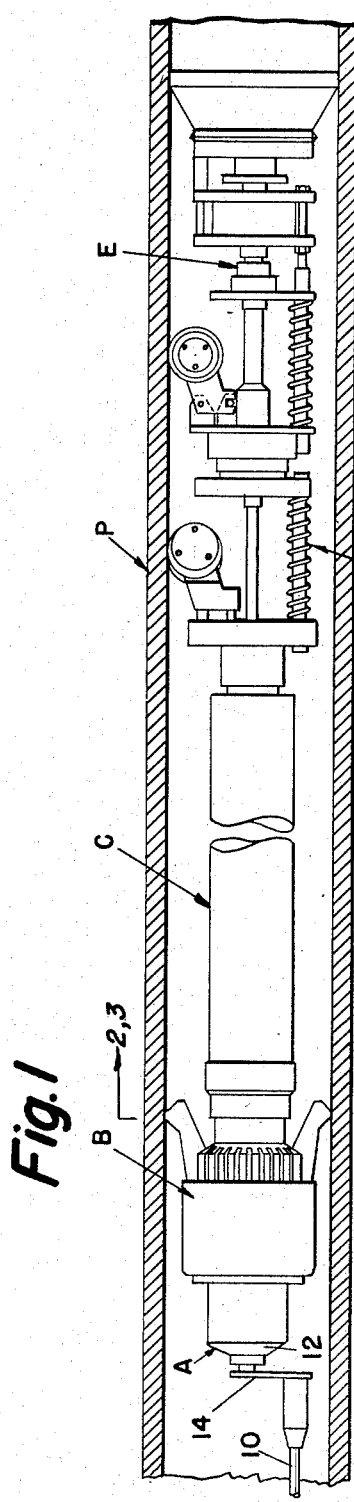
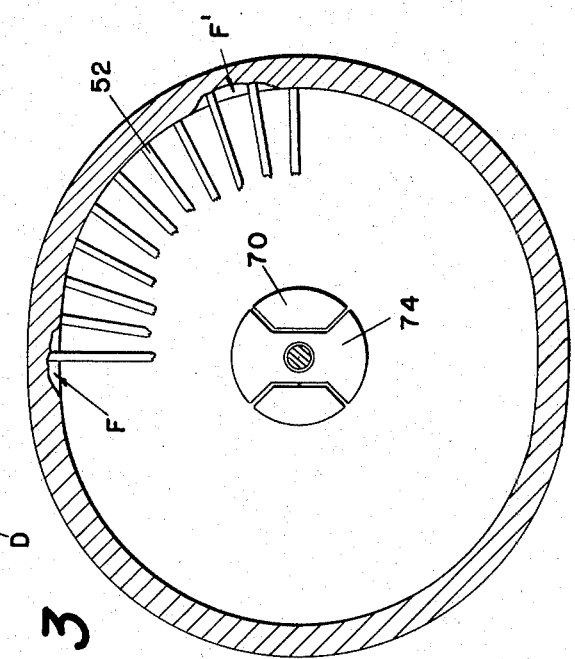
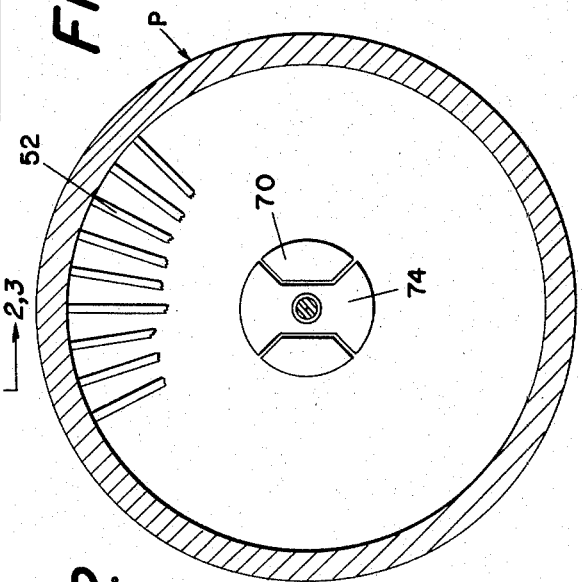
INVENTOR.
JOHN V. FREDD
BY
Robert O. Spindle
ATTORNEY

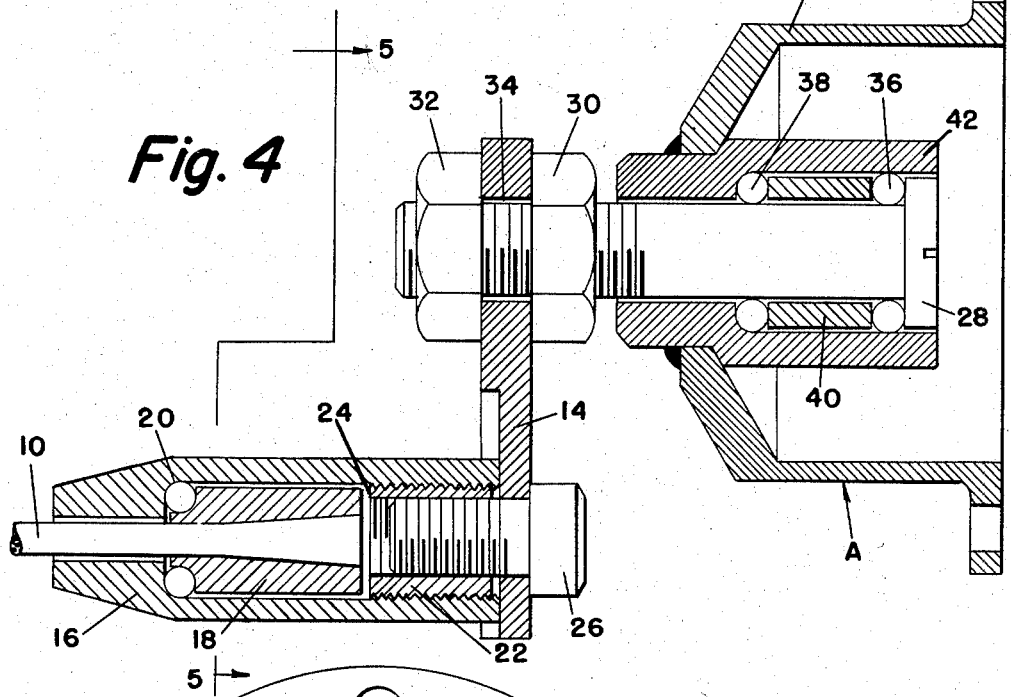
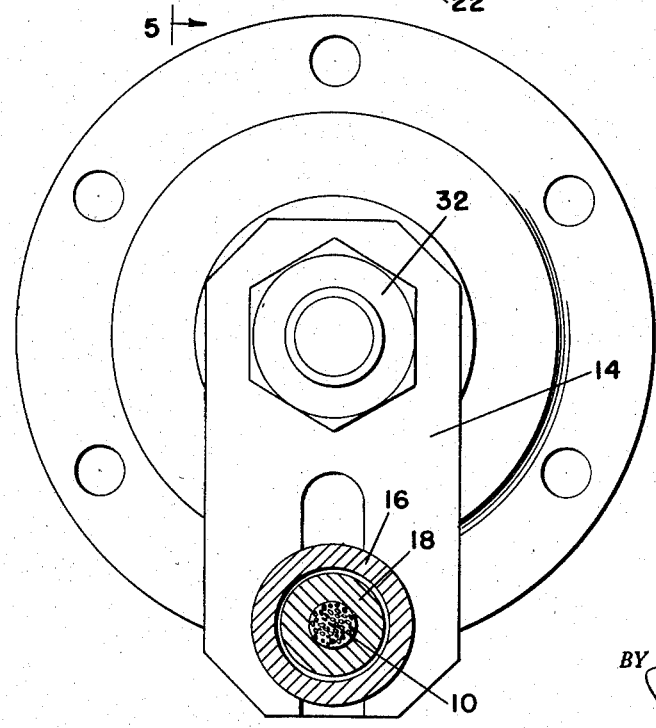

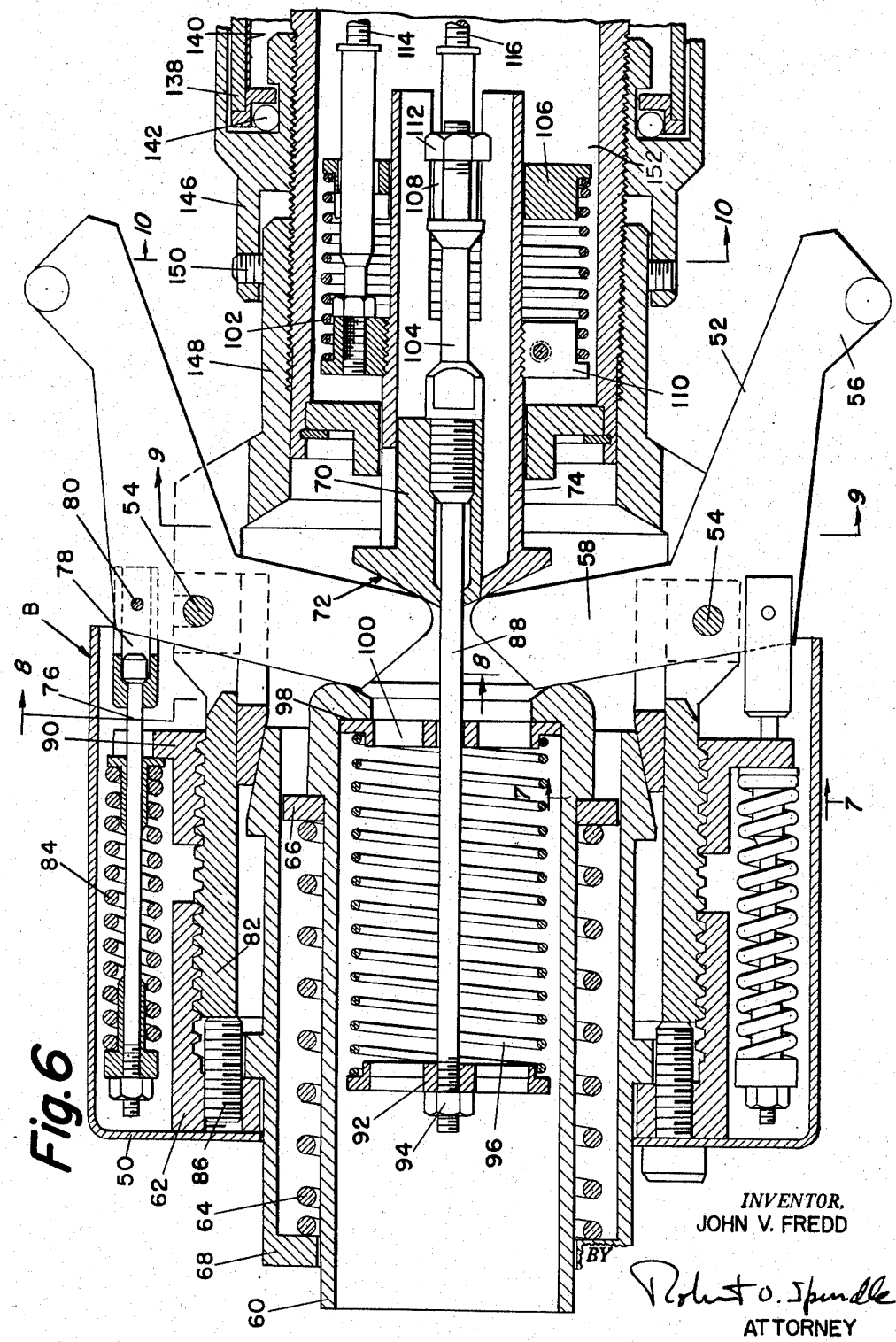

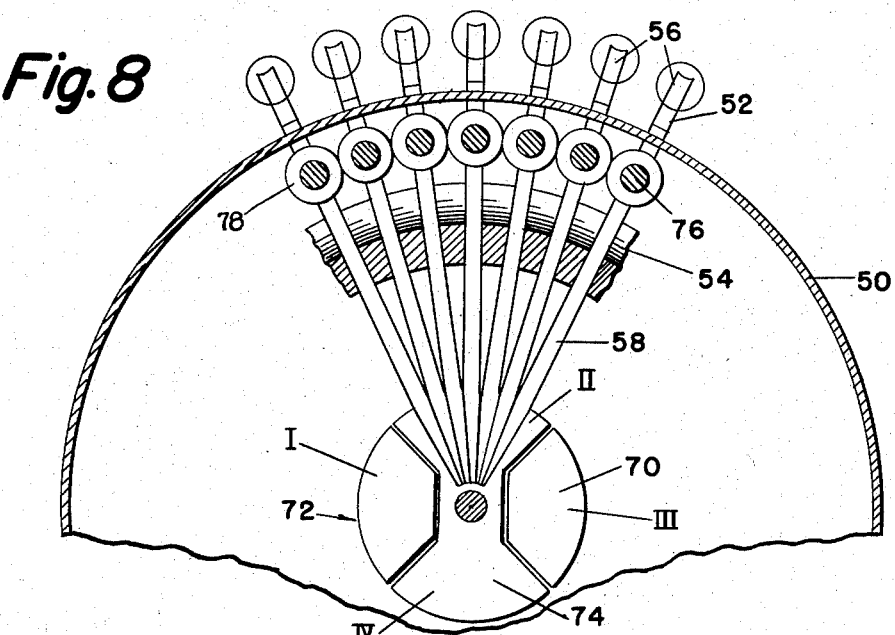
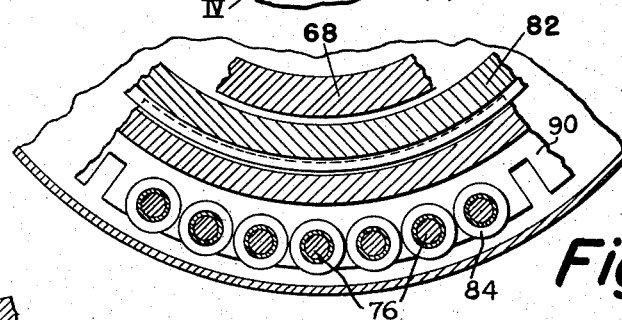
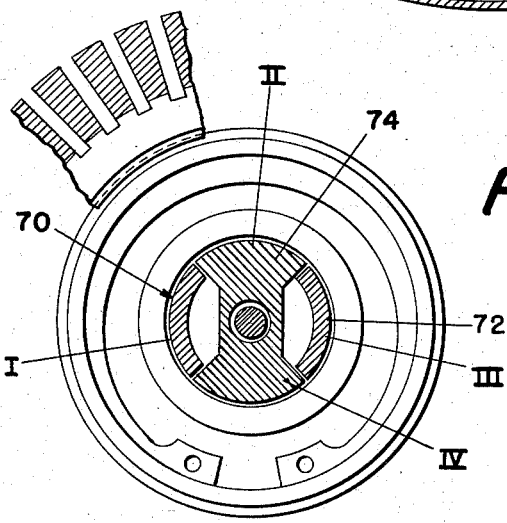

March 3, 1959
J. V. FREDD
2,875,525
PIPE LINE CALIPER
Filed Feb. 17, 1956
10 Sheets-Sheet 6
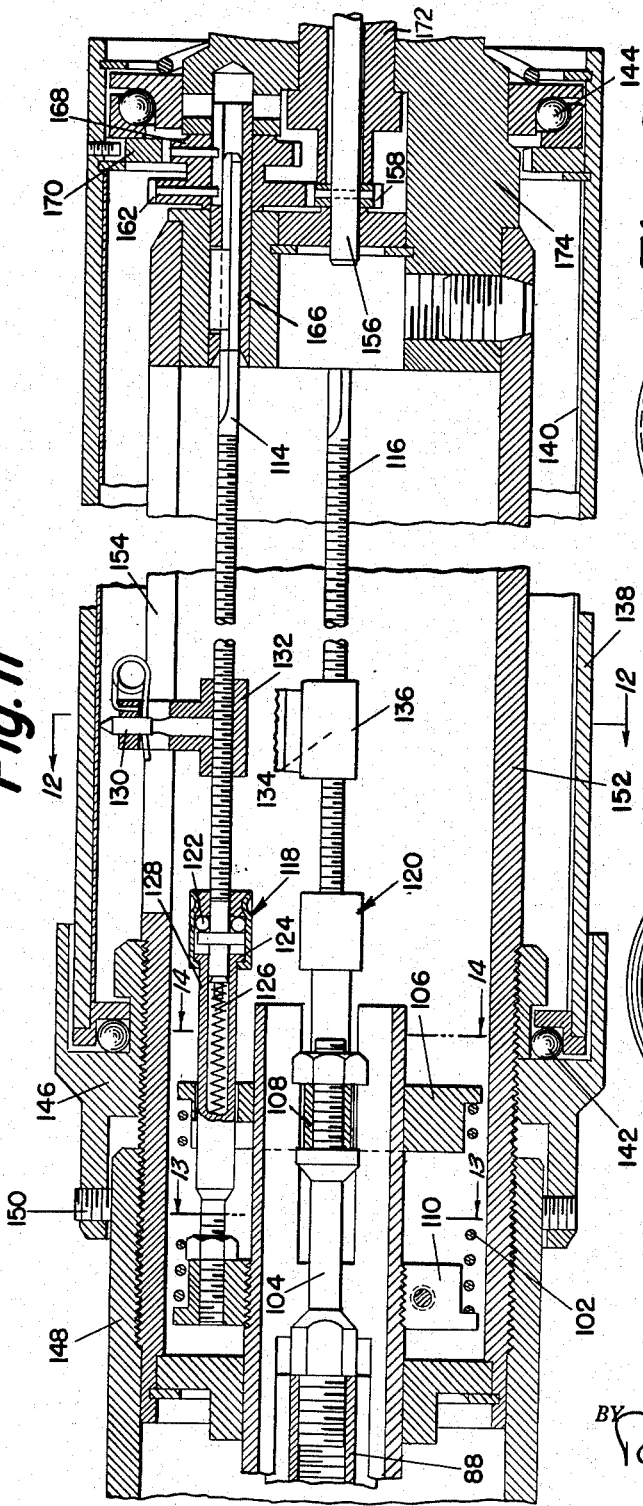
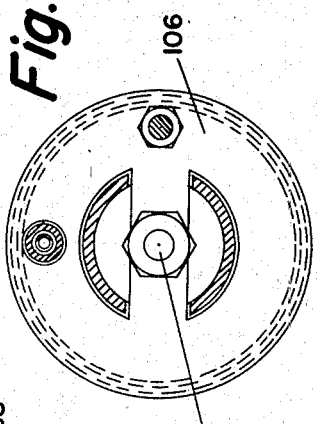
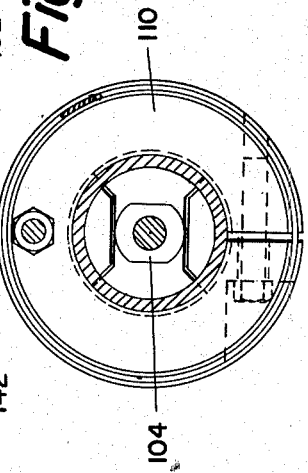
INVENTOR.
JOHN V. FREDD
BY Robert O. Spindle
ATTORNEY

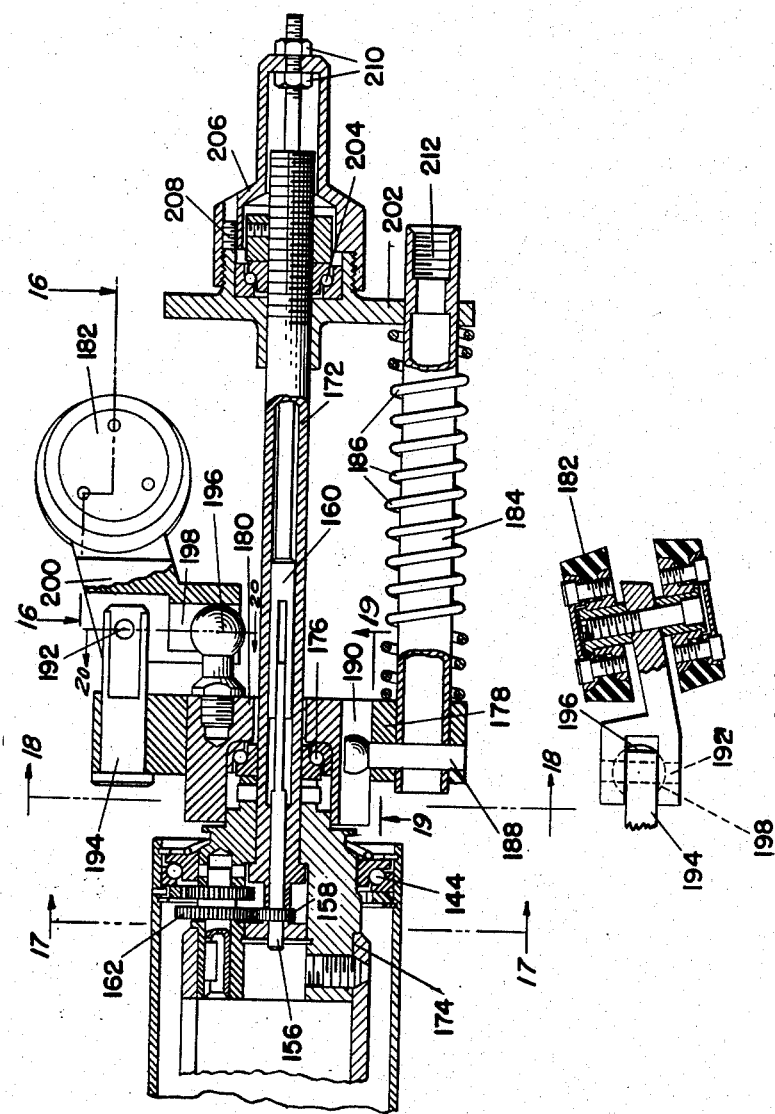

March 3, 1959  J. V. FREDD  2,875,525
PIPE LINE CALIPER

Filed Feb. 17, 1956

INVENTOR.
JOHN V. FREDD

BY Robert O. Spindle

ATTORNEY

INVENTOR.
JOHN V. FREDD

United States Patent Office 2,875,525
Patented Mar. 3, 1959

2,875,525

PIPE LINE CALIPER

John V. Fredd, Dallas, Tex., assignor, by mesne assignments, to Otis Engineering Corporation, Dallas, Tex., a corporation of Texas Application February 17, 1956, Serial No. 566,129

37 Claims. (Cl. 33—178)

The present invention relates in general to tube calipering devices and particularly to that class of such devices designed for use in calipering the internal surfaces of extended lengths of tubing such as used in the production of petroleum. The device has special utility in detecting pits, depressions and other flaws in the internal surfaces of pipe lines which do not remain circular in cross-section because of horizontal and vertical changes in direction.

For economic reasons, pipe lines generally follow the earth's surface and are horizontally disposed to connect selected terminal points determined by both physical and right of way conditions. The resulting fluid conductor, or pipe line, is substantially horizontal in general gradient but contains both horizontal and vertical curves, sometimes both in the same locale. As a result, the internal surface requiring calipering is stressed into an ovate section rather than remaining a true circle. In fact, a true circle in cross-section is the exception rather than the rule for such conductors. It is an object of this invention to provide a calipering device for pipe lines which when passed through the same will effect a continuous record of the internal surface configuration of the pipe under actual conditions of usage. A further object is to provide a calipering device for pipe lines which will sense and record the internal surface configuration of pipe which is out-of-round. Still a further object of this invention is to provide a device which will sense the internal surface configuration of out-of-round pipe and effect a continuous record of the depth of pits, cavities and other depth defects of such deformed sections.

An additional object of this invention is to provide a device which will record the internal configuration and defects of a pipe line with a maintained speed relationship between movement through the pipe line and the operation of the recording elements.

These and other equally important objects of this invention, later apparent, are achieved by the design and arrangement of the cooperating feeler and recording mechanisms responsive to a unique driving sub-assembly. This combination comprises a plurality of independently operated feeler elements, each of which is actuated in accordance with any pit or depression encountered as the calipering unit passes through the pipe or tubing. These independently operated feeler elements are peripherally spaced, at equal intervals, about the perimeter of a supporting body and, during the operation, are in frictional engagement with the internal pipe surface. By dividing the peripherally positioned feelers into groups and making the groups of feelers respond to diameter changes and actuate a responsive stylus, means for indicating the degree of out-of-roundness or deformation existing in the pipe is obtained as well as a proper recording of the internal surface pits and depressions. Additionally, as each of the feeler elements is independently operable, variations from the normal inner radius of each diameter of the pipe will be indicated, that is, as a pit or depression is encountered the feeler elements independently enter a pit or depression and the responsive stylus is further actuated. The record as made by these styluses, however, will show only the deepest pit encountered for each stylus separately since each of these styluses will respond radially only to the feeler which moves the greatest distance.

In addition to each feeler element being independently operable, the groups will cooperate to actuate their responsive stylus when a joint, connection or other union means changing the pipe diameter is encountered. This function of uniform indication of a known diameter change is important in correlating the recorded pits and depressions with the pipe in place. Weaknesses requiring repair or replacement can be readily located by reference to these established interruptions.

It will be understood from the above that the calipering portion of the instrument, namely the feeler elements and the recording means, is arranged to provide three complemental functions. A pipe line of a length determined only by the ratio consumption of the chart space of the recorder can be calipered for pits and depressions in the internal surface securing a record of usefulness for needed repair. Additionally, by using separate styluses responsive to feeler members divided into operating groups, continuous calipering is assured over all the internal surface of the pipe, plus an indication of how gravely out-of-round the pipe may be. And finally, because of the constant relation of recorder drive to distance travelled in the pipe line, the exact location of these defects can be determined. It will be seen, further, that the calipering unit disclosed here may be either pulled or pushed through the pipe line and is designed for use in pipes of varying diameters.

Using separate styluses with separate feeler responsive groups to meet these problems requires further design changes to support the operation of this device. Complete feeler coverage of the internal surface of the pipe insuring a record of all pits and depressions requires a multiplicity of closely arranged feelers with a resultant relocation of the resilient actuating means. Such relocation of the resilient means, together with means for adjusting the loading for each task, due to a wide variety of overlapping pipe diameters and thicknesses, assures properly centering the caliper in the respective pipe line. The group-responsive feeler arrangement necessitates a completely different recording mechanism adapted to cooperate with the several styluses. By rotating the chart in conjunction with longitudinally moving the separately responsive styluses, comparable helical records of desired pitch and detail are obtained on one chart serving both as the caliper record and also as an indication of the shape of the pipe cross section.

A driving mechanism capable of operating in pipes of changing ovate section for driving the styluses and chart introduces a further modification in the combination. It is preferred to use a rotary drive means operated by frictionally engaged means such as wheels moving spirally along the pipe as the caliper is pulled or pushed through it. These wheels are arranged to maintain frictional engagement of the inner surface regardless of the diameter changes due to pipe deformation, simultaneously correcting the angle of contact with the pipe wall to maintain the necessarily constant driving action of the recording mechanism.

In making the device operable by either pulling or pushing, in addition to a connection for a pulling line on the lead end, it is necessary to include a pressure responsive means on the tail end for pushing the caliper, removable when pulling the device. It will be understood that such a sub-combination must not interfere with the accurate operation of the recorder driving mechanism which must operate at selected speed for either the pulling or pushing condition, or both propelling means, if desired. Further, the pushing means must not rotate thereby affecting the constancy of the driving mechanism and accuracy of the recorded data, but must be lineal in movement. It will be understood that speed control is necessary to the accuracy of the device as calipering sensitivity is greatly affected by the speed of operation.

The complete structure and the method fo operation will be more fully understood by the following detailed description with reference to the drawing, in which:

Figure 1 is a view of the complete, assembled device operatively positioned in a pipe line.

Figures 2 and 3 are sectional views of Figure 1 taken at the same section showing position of feeler elements where pipe is both circular and out-of-round, respectively.

Figure 4 is a view, partly in section, of the head end of the device showing a pulling attachment.

Figure 5 is a view of Figure 4 partly in section, taken on line 5—5.

Figure 6 is a sectional view of the feeler assembly and a portion of the recording mechanism.

Figures 7 to 10, inclusive, are cross-sectional views of Figure 6, taken on lines 7—7; 8—8; 9—9; and 10—10, respectively.

Figure 11 is a longitudinal elevation of the chart chamber and recording elements partly in section.

Figure 12:
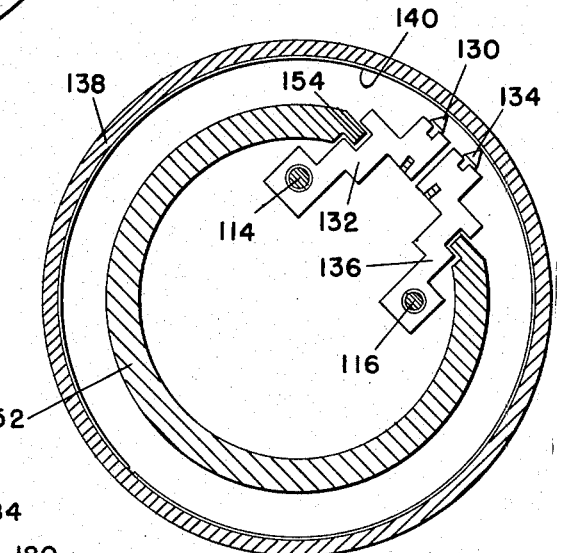

Figures 12, 13 and 14 are sectional views of Figure 11 taken on lines 12—12; 13—13; 14—14.

Figure 15 is a sectional view of the remainder of the recording mechanism and recorder driving assembly at reduced scale.

Figure 16 is a sectional view of an element of Figure 15 taken on line 16—16.

Figures 17 to 20, inclusive, are cross-sectional views of Figure 15 taken on lines 17—17; 18—18; 19—19; and 20—20; respectively showing details in varying scales for clarity.

Figure 21:
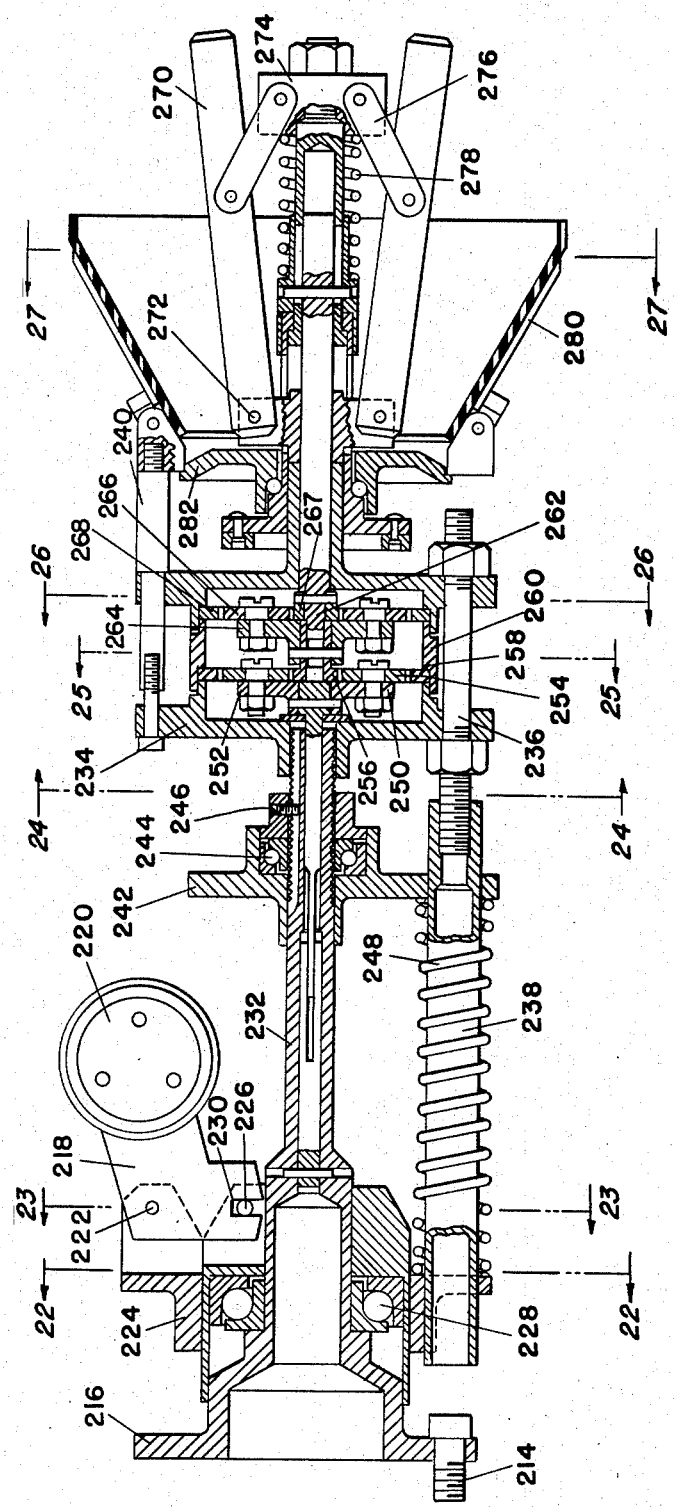
Figure 22:
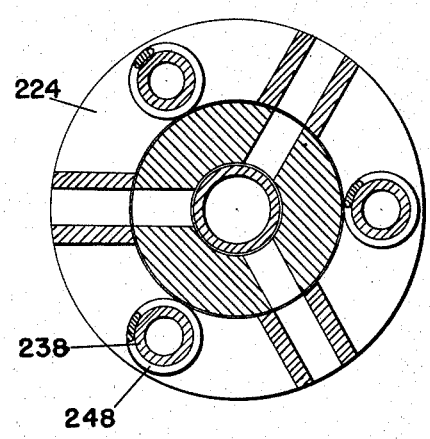
Figure 23:
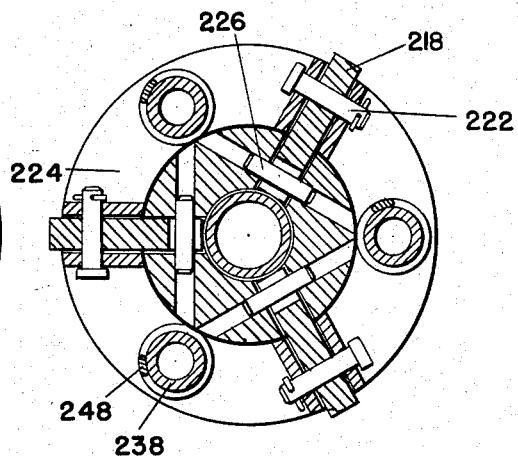

Figure 21 is a sectional view of the pusher assembly shown in position for connection to the recorder drive assembly.

Figures 22 to 27, inclusive, are sectional views of Figure 21 taken on lines 22—22; 23—23; 24—24; 25—25; 26—26; and 7—7, respectively.

The complete calipering instrument is shown in operating position in Figure 1 as it appears when calipering a pipe line. This figure includes both the swivel assembly for pulling the device and the pusher assembly for pushing it. It will be understood that this illustration is an expedient for describing either combination and does not show the mechanism for normal operation. Either one or the other of these propelling means will normally be omitted. Figures 2 and 3 show positions of the feelers 52 extending into calipering contact in both a circular and non-circular pipe section. As later described under the operation of the device, the flaws F and F' detected in the out-of-round or non-circular section affect separate groups of feelers and record both the ovate condition and the gravity of the separate flaws.

For ease of description and understanding, the device is divided into five main sections physically and functionally separable. In turn these main sections will be divided for detail description into sub-combinations of elements, grouped to combine one of the many functions contributing to the complete operation of the device. The main sections are the pulling assembly A, feeler head assembly B, recorder assembly means C, drive assembly D and the pusher assembly E. In describing these major divisions of the device and the sub-assemblies contributing to their separate and collective operations, the instrument will be considered from the pulling assembly end toward the pusher assembly end which is the direction of movement in the calipering operation. Like symbols and numerals will be used to indicate like elements throughout the figures of the drawing.

Reference is now made to Figures 1, 4 and 5 for details of the pulling assembly A specifically and the leading end of the caliper, in general. Flexibility in the pulling operation requires force eccentrically applied to the caliper to overcome curve and obstacle resistance in the pipe line P. An eccentric connection, as shown, minimizes the tendency of the line to pull the caliper off center when rounding a curve or changing direction in any plane. By permitting the eccentric connection to turn freely, the inside of the pipe P acts as a guide for the line, while in straight pipe the weight of the line is minimized as a displacing force. On curves the lateral components of pulling forces act against the pipe walls rather than on the caliper. Consequently these results are achieved by connecting the wire line 10 to the nose 12 by means of an off-set arm 14. Socket 16 holds the anchor 18 of wire line 10 between a forwardly disposed bearing raceway 20 and a plug 22. The plug 22 is threaded both externally and internally providing both a shoulder 24 to enclose anchor 18 and means to secure bolt fastener 26 through a drilled hole in off-set arm 14. Bolt 28 concentrically positioned in cap 12 fixes the other end of off-set arm 14 between nuts 30 and 32. Arm 14 is held between nuts 30 and 32 with the desired rigidity, being freely slidable on bolt 28 by making the mounting hole 34 large enough to slide over the threaded portion of the bolt. Rotation of the bolt 28 as required is insured by the bearing raceways 36 and 38 separated by spacer 40 opposing the pull on the bolt head 28 in the mounting sleeve 42 of cap 12. Figure 5 shows the eccentric mounting arrangement of these elements further supporting the above description and will be referred to further in describing the pulling operation.

Continuing with reference to Figure 1 taken together with Figures 6, 7, 8 and 9, the next major section of the device, namely the feeler head assembly B, will be described in detail. In the broad description of the device above, the requirement of a plurality of closely spaced feelers was touched on. In addition to complete coverage of the internal pipe surface as a correct calipering operation, it will be understood that normal operation requires substantially concentric movement of this portion of the device relative to the pipe being calipered. By increasing the available number of feelers to a maximum about the instrument periphery, and making the feeler resilient positioning means positionally and adjustably effective, proper centering alignment of the feeler head in the pipe line during the calipering operation is obtained. The solution of these problems for maximum efficiency of the device requires additional design and reorganization of the elements.

Figures 6, 7 and 8 show the relative positions and proportions of the feelers together with the operating elements. The cover 50 of section B supports the peripherally spaced feelers 52 as by pivoting means 54. As shown in Figure 8, the pivot support 54 is a hoop of properly dimensioned wire or the like. Each feeler 52 is of the bell crank type having an outwardly extending arm 56 and an inwardly extending arm 58, both relative to the cover 50 and the supporting pivots. A centering plunger 60, actuated by spring 64, compressed between sleeve 68 and plunger supported washer 66, constantly urges the feelers 52 into calipering contact with the inner wall of the pipe. Each of the feelers 52 is engaged by a separate spring guide 76 fastened by a clevis 78 beyond the pivotal suspension point 54 by a second pivotal connection 80 subjecting the feelers to the control of the feeler operating springs 84. Externally threaded portion 82 of the feeler head body receives cap 62 which is secured by screws 86. This portion 82 of the feeler head body also adjustably supports bushing 90, which is slotted to receive spring guides 76 as shown in Figure 7. Thus all feeler fingers are subjected to the compressive effect of centering spring 64 and individually subject to the expansive effect of the separate operating spring 84. By adjusting bushing 90 the spring 84 pressure is controlled for centering and feeler operation in any of the various pipe diameters within the range of the feeler head.

Passing concentrically through the central clearance of the peripherally arranged feelers in operating engagement with the stylus rod support 72, suspension rod 88 extends centrally of the cover 50 and centering plunger 60 to engage an abutting washer 92 fastened thereon by nut 94 or the like. A compressed spring 96 in engagement with the washer 92 and a projecting shoulder 98 and washer support abutting arrangement 100 internally engaging the centering plunger 60 urges half of the stylus rod support 72 (Figs. 7, 8 and 9) into engagement with a group of the feelers 52, comprising half the total number in this instance, in all operating positions of the spring-urged elements.

Referring now to Figures 6 and 9, the division of the feelers into operating groups will be described. In this disclosure opposed quadrant grouping is selected as illustrative of the invention. To those versed in the art, it will be readily understood, however, that further subdivisions of the peripherally disposed feelers into a greater number of groups may readily be accomplished as a mechanical development suggested by the described structure. For convenience the illustrated quadrants of Figure 9 are numbered with Roman numerals I, II, III and IV in a clockwise direction. The feelers 52 in contact with quadrants I and III will move the portion of the stylus rod support 72 numbered 70 in response to their calipering movement. Quadrants II and IV contacted by the feelers engaging that portion of stylus rod support 72 numbered 74 will move that portion. The half of the stylus rod 72 noted as quadrants I and III, and numbered 70, is kept in operating engagement with the feelers by spring 96 which urges suspension rod 88 forwardly. Similarly the half 74 of the divided stylus rod support 72 is kept in operating contact with the feelers by a separate spring 102 compressively mounted between support 106 and a flange 110 fastened to the stylus support portion 74. Each portion of the stylus support 70 and 74 is attached to a separate lead screw 114 and 116 respectively. Styluses 130 and 134 are mounted on these rods as shown in Figures 11 and 12.

Figure 10:
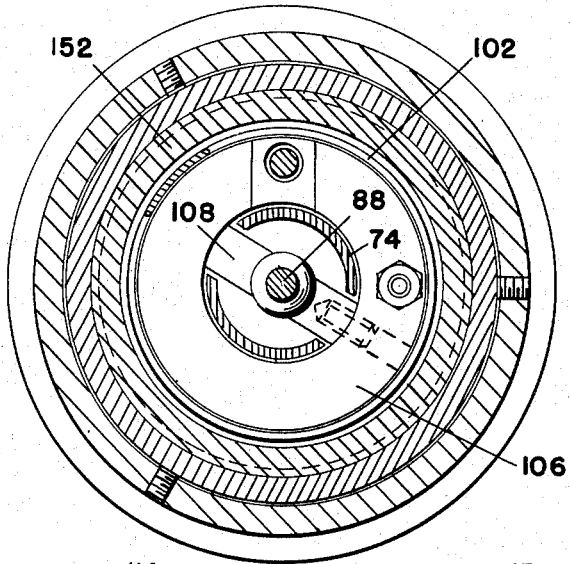

This spring system coacting to support the stylus actuating means in operating engagement with the inwardly extending arms 58 of the feelers 52 will be better understood by a study of Figure 6 taken together with the sectional view of Figure 10 in addition to Figures 7, 8 and 9 described above. In Figure 6 the centering plunger 60 is positioned to be urged by spring 64 acting uniformly on all feelers to push them outwardly into contact with the inner wall of the pipe line P. Suspension spring 96 supported by centering plunger 60 keeps that portion of stylus rod support 72 numbered 70 in contact with the under side of arm 58 of those feelers grouped into quadrants I and III. Figures 7, 8 and 9 indicate this relationship.

An additional, and separate spring 102, positioned behind the inwardly projecting arms 58 of the feelers, in contrast with springs 64, 84 and 96 previously described all positioned ahead of these arms, supports the other half of the stylus rod support 72 (numbered 74) in contact with the arms 58 in quadrants II and IV. This, too, will be clear from Figures 7, 8 and 9.

Reference is now made to the sectional view in Figure 10 to further describe the support for spring 102 as shown in elevation in Figure 6. Support 106, a flange in shape, with a cross-bar 108, is drilled to be suspended by rod 88 and held by nut 112. Spring 102 rests thereon and supports a similar flange 110 threadedly engaged to half 74 of the stylus rod support 72. It will be further evident that this support is also dependent from the centering plunger 60.

Proceeding to a fuller description of the recording elements, it will be realized that Figures 6 and 15 complement each other in illustrating the chart chamber subcombination of the recorder assembly and are shown together with the charting elements in Figure 11. A rotatable chart holder 138, inside which chart 140 is placed, is mounted between forward raceway 142 and rear raceway 144 to permit balanced operation. Mounting collar 146 is secured to the bottom of the feeler head connection 148 between the feeler section and the chart chamber by screws 150. This connection is further illustrated in Figures 6 and 10. Inside the rotatable chart holder a rigid body member 152, also shown in Figures 6, 10 and 15, and additionally detailed in Figure 12, connects the drive assembly, chart chamber and feeler assembly together. Further, this element is slotted as at 154 allowing styluses 130 and 134 (partly broken away in Figure 11 for clarity) to extend through into scribing contact with chart 140. As the stylus bodies 132 and 136 are in threaded engagement with lead screws 114 and 116, they are held in non-rotating position by slot 154 (Fig. 12) and moved longitudinally of the chart chamber during the calipering operation.

Figures 13 and 14 taken sectionally of Figure 11 at the flanges 110 and 106 respectively further illustrate the supporting structure for lead screws 114 and 116 described above. As shown by these two sectional views bolt connector 104 threadedly connects suspension rod 88 to flange 106 by means of cross-bar 108, passing freely through flange 110 and supporting spring 102 therebetween.

These Figures, 11 to 14, inclusive, indicate one of many possible connecting means for linking the lead screws 114 and 116 to the feeler motion transmission means here represented by the quadrant divided stylus rod support 72. In any instance, it is necessary that the lead screws be free to rotate and reciprocate to accomplish the calipering operation. A detachable coupling member 118 and 120, one for each lead screw 114 and 116 respectively, containing a bearing element 122, is held in place by engaging shoulder 124 and lugs (not shown). A spring 126 within the support connector 128 presses the lead screw into operating position against the bearing element 122.

Figure 17:
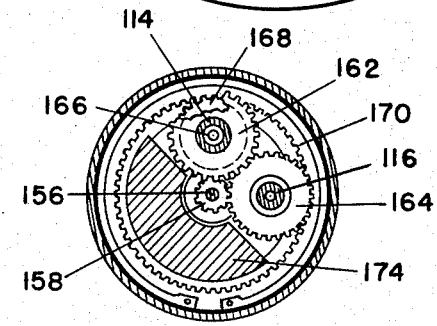

At the rear end of the chart chamber shown in Figures 11, 15 and 17, the driving gears for rotating the chart holder 138 and the lead screws 114 and 116 are housed. A centrally positioned drive rod 156, to which gear 158 is attached in driving contact with gear 162, rotates lead screw 114 at a selected speed. As shown in sectional view Figure 17, this motion in the same speed is transmitted to gear 164 to drive lead screw 116. In this way stylus 130 and stylus 134 are advanced longitudinally of the chart chamber at the same rate and in the same relative positions. Shaft 166 transmits the rotary motion of gear 162 to gear 168 in engagement with ring gear 170, which latter is in operating engagement with chart holder 138, thus rotating chart 140 in selected speed ratio with the longitudinal movement of styluses 130 and 134.

Figure 18:
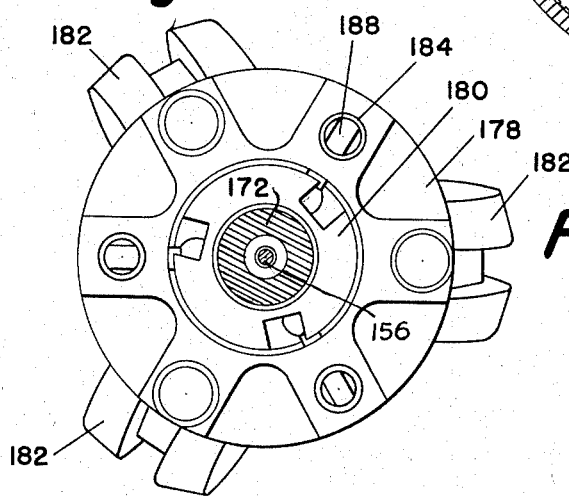

Referring to Figures 15 and 18, the continued structure of the body elements of the device through another body member 172 will be evident. This body member 172 is tubular in section and is machined to firmly attach to the gear train mounting means 174 at the gear train end of the chart chamber. Internally, member 172 is drilled to receive drive rod 156. Within member 172 the flattened end of shaft 156 engages the slotted end of shaft 160 as shown in the drawing.

Once fixed in operating position, body member 172 becomes the support for a bearing raceway 176 with accompanying bearing surfaces, and positions the relatively adjustable rotating members 178 and 180 of the recorder drive mechanism. As shown in Figures 15, 18, 19 and 20, these relatively adjustable rotating members 178 and 180 comprise a number of cooperating elements designed and positioned to keep contact means such as the frictionally engaging drive wheels 182 in helical engagement with the inner pipe surface and positioned at an efficient driving angle relative to the longitudinal axis of the pipe regardless of cross-sectional deviation from the true circular section. Thus constancy of recording mechanism operation relative to distance travelled is assured.

The three equi-spaced drive wheels 182 forming the contacts of the driving means are operably connected for automatic adjustment of the angle of contact for maximum driving efficiency. This means includes three equi-spaced longitudinal shafts 184 and springs 186 adapted to resiliently urge wheels 182 to adjust their operating angle of contact as the diameters of the pipe change within the range of the caliper.

Figure 19:
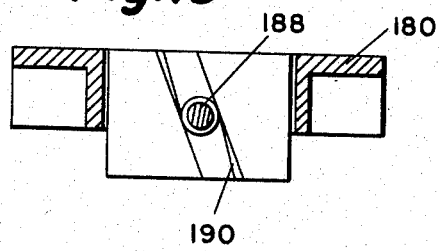

To obtain the most efficient driving angle between wheels 182 and the internal pipe surface relative to the longitudinal axis of the pipe for all driving positions, it is necessary to adjust the position of the engaging surface. Longitudinal shafts 184, three in number here as shown on Figure 18, are positioned between rotating member 178 and rotary driving member 202. These shafts slidably engage their supporting member, position springs 186 and hold pins 188 in operating engagement with slanted slots 190 in rotating member 180 as shown in Figures 15, 18 and 19. Thus any longitudinal movement of member 178 as a result of pressure of spring 186 will move pin 188 along slot 190 and rotate members 178 and 180 relative to each other.

Movement of member 180 moves pin 196 arcuately a comparable distance. As this pin engages slot 198 in the bell crank support of wheel 182, pin 194 rotates and alters the angle of contact with the pipe surface. Pivot 192 together with the free play at point of engagement with pin 196 and the angularity of wheel 182 mounting in both vertical and horizontal planes as shown in Figures 15 and 16, permits desired flexibility. It appears to be self-evident that the force of spring 186 is met or overcome by the contact of elements 182 with the inner wall of the pipe. The movement of the driving elements will work either from or against spring 186.

The rotary driving member 202 mentioned above as a support for shaft 184 and a buffer for spring 186 is rotatably supported by body member 172 on raceway 204. A connector 206 threadedly engages member 202 and is fastened, securely, so as to rotate therewith, as by set screws 208. It, in turn, is locked in rotating engagement with shaft 160 by opposed nuts 210—210, or like arrangement on the threaded end.

As was noted above, the disclosed device is adapted for either pulling or pushing operation in pipe lines. Except for these pushing and pulling assemblies, which perform their separate function on the above detailed feeler, recording and drive combination, this caliper combination remains unaltered. As a preferred pusher assembly embodiment, the sub-combination to be described couples onto the tail-end of the combination described above without change thereto and forms a complete pushed caliper combination as illustrated in Figure 1 taken free of the pulling elements shown there as sub-assembly A. Figures 1, 21, 22, 23, 24, 25, 26 and 27 are referred to in describing this sub-combination.

Without removing any of the elements previously described and illustrated through Figure 15 and sectional figures through 19 and 20, the device shown in Figure 21 is directly connected to the pushing sub-assembly. Bolt holes 212 in shafts 184 (Fig. 15) are engaged by bolts 214 mounted in cover 216 (Fig. 21) which encloses drive member 202 without binding. Loading wheels 220 are positioned and mounted to maintain the pusher assembly as a non-rotating sub-combination. By making these loading wheels 220 radially adjustable relative to the device as indicated in Figure 21, a retarded speed of rotation in the same direction, a reversed rotary movement, or no rotation at all, may be achieved to facilitate operation. However, for purposes of control of the movement of the device in the pipe line as a result of the pusher under all conditions, the rotary movement of the drive assembly as distinct from any rotary movement of the pushing sub-combination is transferred back to the rear of the pusher element to operate a governing mechanism, later described.

Figure 24:
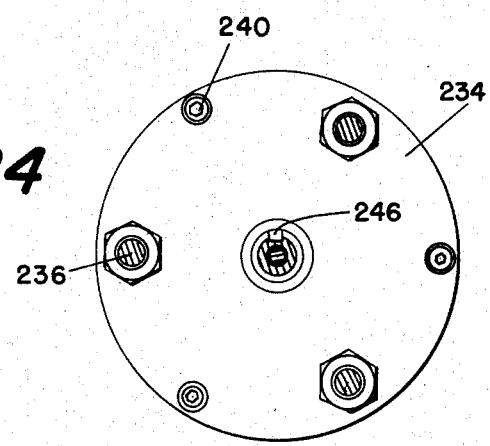

Drive member cover 216 is mounted in loading wheel support 224 and engages ball bearing raceway 228 with proper surfaces being thus free to rotate. Pusher assembly drive shaft 232 extends backwardly to engage gear train housing 234. Peripherally spaced rods 238 position loading wheel support 224 and gear train housing 234 in spaced relation. A bearing support 242 enclosing a bearing raceway 244 pressing against fixed stop 246 on rotating drive shaft 232 is spring-pressed by spring 248 with gear assembly 250 in gear train housing 234. The spacing and relative position of these elements are shown in Figure 24. Connecting rods 236 extend rods 238 to hold gear train housing 234 relative to loading wheels 220, while rods 240 extend from the housing 234 to position the propelling means or fluid scoop 280.

Loading wheel support 224 mounting bell crank brackets 218 of wheels 220 on pivots 222 is longitudinally slidable on drive cover 216, being constantly urged toward the leading end of the device by the effect of springs 248. Bell crank brackets 218 extending to engage fixed pins 226 in slotted apertures 230 rotate wheels 220 forcibly outwardly to engage the inner pipe wall in frictional engagement. Thus the linear (retarded or reverse) movement of this portion of the device is maintained during the calipering operation.

Figure 25:
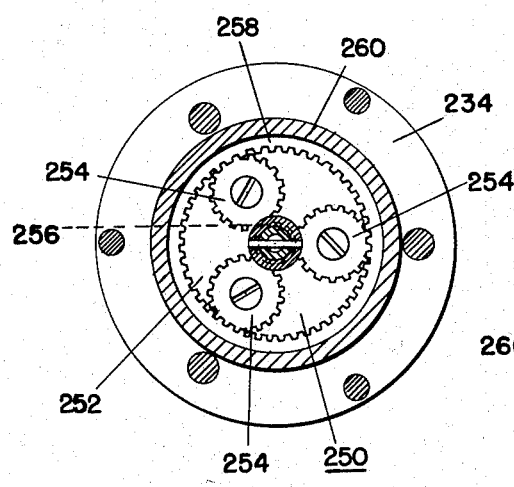
Figure 26:
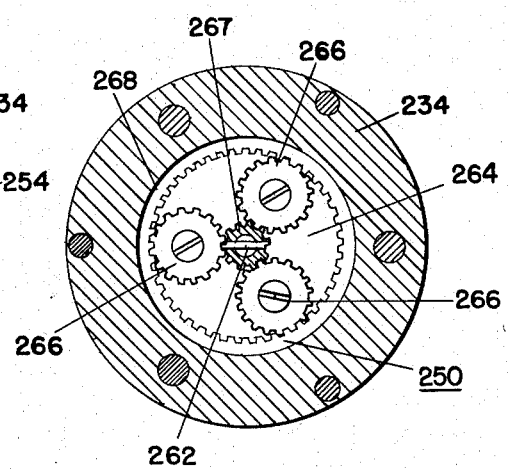

Figures 25 and 26, together with Figure 21, are referred to in describing the gear train housing and the operating elements enclosed which operate the speed governing device of the pusher element. Gear assembly 250 includes a rotatable face plate 252 mounting several gears 254 which extend into engagement with a ring gear 258 on a fixed section 260 of the wall of the gear train housing. Shaft 232 imparts rotary motion to the rotatable face plate 252 in turn rotating gears 254 engaged in ring gear 258. The speed of gears 254 is increased in selected ratio over the rotary speed of shaft 232. As shown in these figures, particularly Figure 25, this increased speed of rotation is imparted to centrally positioned gear 256.

An arrangement of gears, duplicating that described above, receives the increased speed of gear 256 through face plate 264 to which gear 256 is pin connected. The rotation of this face plate rotates gears 266, also engaging a ring gear 268 so that a further increase of speed is imparted through gear 267 to shaft 262. Thus the speed of shaft 232 is amplified in predetermined ratio to rotate shaft 262 for operation of the propelling mechanism governor. It is evident by this chain of moving elements that the drive assembly rotation is transmitted at predetermined speed to pusher drive shaft 262 for any selected driven speed of the recorder drive mechanism.

On shaft 262, at the exposed rear of the device in the scoop-shaped propelling means 280, a centrifugally operated governor arrangement is mounted, driven by this shaft. Weighted bars 270 pivoted at 272 to the shaft are connected to a slidable member 274 by pivot connected arms 276. Spring 278 resists longitudinal movement of slidable member 274 as bars 270 are centrifugally urged outwardly by the speed of rotation of shaft 262.

Figure 27:
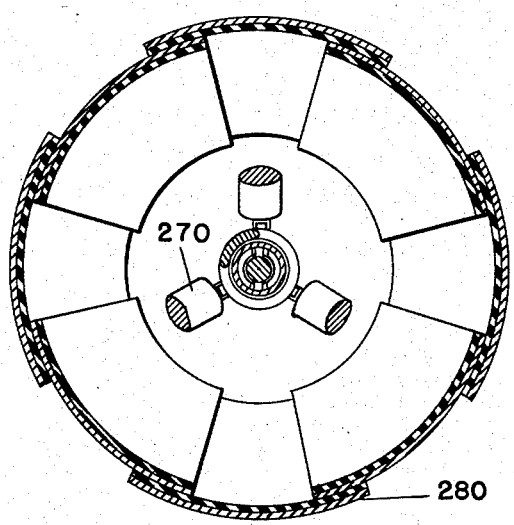

The propelling means 280 detailed in section in Figure 27 receives and contains the driving fluid which urges the caliper through the pipe line by peripherally contacting the inner wall of the pipe. A stop or valve 282 positioned by the weight bars 270 and the spring 278 normally closes the forward end of the propelling means 280 thereby containing the pushing fluid. An extreme of pressure or an excess of rotary speed as a reflection of the linear speed of movement of the caliper through the pipe line will throw the centrifugally operated arms outwardly, move the stop 282 to uncover the forward end of the scoop-shaped propelling means and release fluid, thus regulating the movement through the pipe line by reducing the effect of the driving force.

Those versed in the art will not need further description to understand the operation of the device either as a pulled or pushed mechanism. To emphasize the flexibility of the caliper in general, and the novel features introduced to permit calipering out-of-round pipe sections specifically, however, the operation of the device will be discussed briefly.

Although it is possible, if desired or necessary, to both pull and push the caliper without injury, as suggested by Figure 1, it is seldom used that way. When used as a pulled instrument, a wire line 10 is passed through the section of pipe line to be calipered usually by fastening it to a go-devil as an initial transmission means for the wire line between the ends of the pipe section to be calipered. The caliper is then composed of the sections shown in Figures 1 and 4 to 20, inclusive, the pusher section shown in Figures 21 to 27, inclusive, being omitted. As indicated above, the eccentric arrangement linking the wire line to the caliper shown in Figures 4 and 5 facilitates passage of the mechanism through curved portions of the pipe line and keeps the wire line from fouling or binding in irregular passages.

In preparation for the pulling operation, the head end of the caliper is inserted in the pipe line, and the device urged forward until the recording chart driving mechanism is engaged. It will be evident that the feelers 52 are in contact with the inner wall of the pipe, being ahead of the drive elements, and are urged outwardly into centering and calipering position by the combined effect of centering spring 64 and the separate operating springs 84. The respective styluses 130 and 134, positioned on the quadrant suspended lead screws 114 and 116 respectively, are positioned and activated by springs 96 and 102. Spring 96 operably supporting stylus 134 is mounted adjacent the feelers 52 in the feeler head portion and suspends the operating opposed quadrants I and III in contact with one side of the group of cooperating feelers by means of rod 88. The remaining two opposed quadrants II and IV are supported in operating contact with one side of the attended group of feelers by spring 102 positioned in the chart chamber section, also suspended by means of rod 88.

As the caliper is advanced in the pipe, the outwardly urged feelers follow the inner surface contour moving into pits and depressions as they are encountered (see Figs. 2 and 3). At any given section, the outward movement of the feelers which enter the deepest depression F and F' of pipe P is that which affects the chart record of any individual stylus responding to the group of feelers operating in relation therewith. The expression "group of feelers" is used here as collectively representing the opposed group of styluses in the respective quadrants of the described device, or similar arrangement, enabling two or more separate records to be obtained each receiving the greatest outward movement of its respective operating feelers only. This arrangement permits the feelers in each group attending each of the styluses to transmit the position of the most depressed portions of the pipe in contact with the most extended portions of the feelers affecting the respective quadrants in addition to recording the changes in pipe diameters by conforming the separate records. By such movements, readily recorded by the two styluses operating independently, out-of-round conditions are indicated and the true relative depths of the defects are determinable. Further, as both of the styluses are started at the same elevation in the chart chamber, and are moved longitudinally thereof equally, due to like threaded stylus rods and uniform rotation of the elements, comparison of the scribed record reveals these irregular conditions of the pipe line interior. It will be evident that comparison of the separate stylus positions is a record of diameter variations from the true round condition, while the record of radial deviations is revealed by the regularity or irregularity of each stylus recording. Thus the diameter variations are recorded and radial deviations beyond these diameter differences are also evident on the record.

The detailed description of the elements discloses that the two styluses do not rotate in the chart chamber, both being longitudinally movable by cooperating with their respective, threaded lead screws. This is accomplished by rotating the lead screws and holding the styluses in scribing position on the chart by a slotted rigid body member 152. Rotatable chart holder 138 in which chart 140 is mounted moves around the styluses while they are held in this scribing position. As further explained above, a gear system cooperating with both the respective lead screws and the chart holder rotates these elements uniformly and at a speed proportional to the spirally moving drive mechanism shown in Figure 15.

Figure 20:
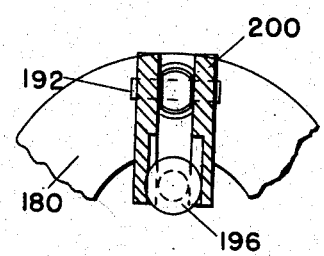

Movement of the caliper through the pipe, as it is pulled at the end of wire line 10, engages drive wheels 182, shown in Figures 1, 15 and 20, in driving relation with the pipe. Wheels 182 are adjusted outwardly, compensating for diameter deviations, by the effect of the several springs 186 acting thereon as described and in response to the control movement of pins 188 and 196 they maintain the proper angle of engagement with the inner pipe surface for spirally driving the chart holder at controlled speed.

Reference to Figure 21 and the sectional views of that figure together with Figure 1, will immediately make clear the changes required to make the above described mechanism a pushed device in contrast with the pulled caliper. As previously noted, the wire line connection illustrated and described as Figures 4 and 5 is removed where the pushing operation alone is desired. The pusher assembly of Figure 21 and associated sectional views is coupled directly to the drive assembly, as noted above, before inserting the caliper in the pipe line.

In moving through the pipe line, all the elements for calipering described above as a pulled device, function in the same way when pushed. The feelers, chart assembly and drive elements operate as before with the same result. Forward movement, in response to fluid flow, is given to the caliper by means of this pusher assembly which includes aligning, propelling and speed control means.

No rotary movement is allowed to be transmitted to the caliper by the pusher as this would affect the regularity and rate of rotation of the chart mechanism. Loading wheels 220 are urged into linear or angularly adjusted contact with the pipe inner surface by means of respectively cooperating springs 248 and hold the pusher assembly substantially non-rotatable. This is the aligning means. The fluid pressure in the pipe line is received in the expansible scoop 280, or propelling means, which peripherally engages the pipe surface to receive all the pressure available. This full use of all the available driving pressure is frequently, however, excessive and if continued would drive the caliper too fast to make a proper record on the chart. Proper movement relationship is obtained and retained by making the pressure used by the scoop proportionate to the speed of rotation of the chart driving mechanism. This rotary motion is transmitted to the centrifugally operated governor which opens and closes a valved aperture in the scoop, adjusting the amount of pressure retained for driving, to regulate the speed of the device. This is the speed control means.

There has been disclosed a caliper for use in pipe lines which records diameter variations and increases in the radii of these diameters. Under conditions where pipe must bend to meet surface variations and correct geographical locations such as required by pipe lines, weakened areas in these simple and compound bends must be revealed by calipering as well as such areas in straight, truly circular sections. Further to make a record of proper use, the speed of the caliper in the pipe line must be proportionate to the speed of the recorder elements. By adjusting the angle of frictional engagement of the recorder driving means under conditions of diameter deviations, together with speed regulation of the pusher assembly, the recorder-to-lineal movement of the calipering device is accurately maintained. By the means revealed here pits and depressions in all portions of the pipe are located and measured regardless of changes in cross-section. In addition a measured record of these cross-section diametrical differences is obtained.

What is claimed is:

1. A caliper comprising means for measuring a plurality of internal diameters of a tube and for measuring the maximum radial deviation from the measured diameters, said means including a plurality of feelers divided into a plurality of peripherally spaced groups, each group of feelers measuring one segment of the tube, individual means for urging each of said feelers outwardly independently of each other into calipering position, and means for recording the measurements.

2. A caliper comprising means for measuring a plurality of internal diameters of a tube and for measuring the maximum radial deviation from the measured diameters, said means including a plurality of feelers divided into a plurality of peripherally spaced groups, each group of feelers measuring one segment of the tube, individual means for urging each of said feelers outwardly independently of each other into calipering position, and means for recording the measurements, said recording means including a stylus for each group of feelers.

3. A caliper comprising means for measuring a plurality of internal diameters of a tube and for measuring the maximum radial deviation from the measured diameters, said means including a plurality of feelers divided into a plurality of peripherally spaced groups, each group of feelers measuring one segment of the tube, individual means for urging each of said feelers outwardly independently of each other into calipering position, and means for recording the measurements, said recording means including a stylus for each group of feelers, and a separate motion transmission means between each group of feelers and its respective stylus.

4. A caliper comprising means for measuring a plurality of internal diameters of a tube and for measuring the maximum radial deviation from the measured diameters, said means including a plurality of feelers divided into a plurality of groups, each group of feelers measuring one of the tube diameters, individual means for urging each of said feelers outwardly independently of each other into calipering position, and means for recording the measurements, said recording means including a stylus for each group of feelers and a separate motion transmission means between each of said groups of feelers and its respective stylus, the maximum movement of any one feeler in a group moving said motion transmission means for said group to move the stylus for said group to thus record the maximum radial deviation of the diameter measured by said group.

5. A caliper as set forth in claim 4 further characterized in that the plurality of feelers forming each of the plurality of groups are diametrically opposed to each other.

6. A caliper as set forth in claim 1 further including means common to all of said feelers for urging all of said feelers outwardly into calipering position.

7. A caliper as set forth in claim 4 further including means for maintaining a portion of all of said feelers forming the respective groups in operative engagement with the respective group motion transmission means.

8. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, contact means mounted on said head and extending outwardly therefrom for frictional engagement with the tubing, said contact means being positioned at an angle relative to the longitudinal axis of the housing, and means for automatically adjusting the angle of said contact means relative to the housing in accordance with the changes in diameter of the tubing.

9. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, contact means mounted on said head and extending outwardly therefrom for frictional engagement with the tubing, said contact means being positioned at an angle relative to the longitudinal axis of the housing, and means for automatically adjusting the angle of said contact means relative to the housing in accordance with the changes in diameter of the tubing, said automatically adjusting means including means for changing the radial distance between said head and said contact means.

10. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, contact means mounted on said head and extending outwardly therefrom for frictional engagement with the tubing, said contact means being positioned at an angle relative to the longitudinal axis of the housing, and means for automatically adjusting the angle of said contact means relative to the housing in accordance with the changes in diameter of the tubing, said automatically adjusting means including means for increasing the radial distance between said head and said contact means and simultaneously increasing the angle between said contact means and the longitudinal axis of the housing.

11. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, contact means mounted on said head and extending outwardly therefrom for frictional engagement with the tubing, said contact means being positioned at an angle relative to the longitudinal axis of the housing, means for urging said contact means into frictional engagement with the tubing and for automatically adjusting the angle of said contact means relative to the housing in accordance with the changes in diameter of the tubing.

12. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, contact means mounted on said head and extending outwardly therefrom for frictional engagement with the tubing, said contact means being positioned at an angle relative to the longitudinal axis of the housing, and means for automatically adjusting the angle of said contact means relative to the housing in accordance with the changes in diameter of the tubing, said automatically adjusting means including a rotatable member wherein rotation of said member in one direction will decrease the radial distance between said head and said contact means and simultaneously decrease the angle between said contact means and the longitudinal axis of the housing.

13. In a calipering and recording device for measuring and recording the internal configuration of an extended length of tubing having varying diameters, the device having a housing, the improvement in the driving mechanism of the recording device for driving the same at substantially a constant speed relative to the speed of passage of the housing through the tubing, the driving mechanism comprising a driving head rotatably mounted on the housing, connecting means between said head and the recording device, a plurality of driving wheels mounted on said head extending about the periphery thereof and extending outwardly therefrom for frictional engagement with the tubing, said driving wheels being positioned at an angle relative to the longitudinal axis of the housing, means for automatically adjusting the angle of each of said driving wheels simultaneously relative to the housing in accordance with the changes in diameter of the tubing, said automatically adjusting means including a rotatable member wherein rotation of said member in one direction will increase the radial distance between said head and said driving wheels and simultaneously increase the angle between said driving wheels and the longitudinal axis of the housing, and resilient means for urging said rotatable member in said one direction and simultaneously urging said driving wheels into frictional contact with the tubing.

14. A calipering device adapted to be passed through an extended length of tubing by fluid pressure, said device comprising a housing, propelling means secured to said housing adapted to be engaged by fluid passing through the tubing to move said housing through the tubing, and means for by-passing a portion of the fluid to prevent the housing from moving through the tubing at an excessive speed.

15. A calipering device adapted to be passed through an extended length of tubing by fluid pressure, said device comprising a housing, propelling means secured to said housing adapted to be engaged by fluid passing through the tubing to move said housing through the tubing, and valve means for by-passing a portion of the fluid to prevent the housing from moving through the tubing at an excessive speed.

16. A calipering device adapted to be passed through an extended length of tubing by fluid pressure, said device comprising a housing, propelling means secured to said housing adapted to be engaged by fluid passing through the tubing to move said housing through the tubing, valve means for by-passing a portion of the fluid to prevent the housing from moving through the tubing at an excessive speed, and a governor for regulating said valve means.

17. A calipering and recording device adapted to be passed through an extended length of tubing by fluid pressure for measuring and recording the internal configuration of the tubing, comprising a housing, a plurality of feelers mounted on said housing, recording means carried by said housing, means connecting said feelers with said recording means, driving means mounted on said housing for said recording means, propelling means mounted on said housing adapted to be engaged by fluid passing through the tubing to move said housing through the tubing, means for by-passing a portion of the fluid to prevent the housing from moving through the tubing at an excessive speed, and means regulating said by-passing means in relation to said driving means.

18. A calipering and recording device adapted to be passed through an extended length of tubing by fluid pressure for measuring and recording the internal configuration of the tubing comprising a housing, a plurality of feelers mounted on said housing, recording means carried by said housing, means connecting said feelers with said recording means, driving means mounted on said housing for said recording means, propelling means mounted on said housing adapted to be engaged by fluid passing through the tubing to move said housing through the tubing, means for bypassing a portion of the fluid to prevent the housing from moving through the tubing at an excessive speed, and a governor connected to said driving means for regulating said bypassing means in relation to said driving means.

19. A calipering and recording device as set forth in claim 18 including loading wheels mounted on said propelling means to prevent rotation of the device as it is passed through the tubing.

20. A caliper comprising means for measuring a plurality of internal diameters of a tube and for measuring the maximum radial deviation from the measured diameters, said means including a plurality of peripherally spaced feelers divided into a plurality of groups, each group of feelers measuring one segment of the tube, individual means for urging each of said feelers outwardly independently of each other into calipering position, means for recording the measurements, and means for driving said recording means.

21. A caliper comprising means for measuring a plurality of internal diameters of a tube and for measuring the maximum radial deviation from the measured diameters, said means including a plurality of peripherally spaced feelers divided into a plurality of groups, each group of feelers measuring one segment of the tube, individual means for urging each of said feelers outwardly independently of each other into calipering position, means for recording the measurements, said recording means including a stylus for each group of feelers, and means for driving said recording means.

22. A caliper comprising a housing, means mounted on said housing for measuring a plurality of internal diameters of a tube and for measuring the maximum radial deviation from the measured diameters, means carried by said housing for recording the measurements, and means mounted on said housing for driving said recording means, said driving means including a driving head rotatably mounted on said housing, connecting means between said head and said recording means, contact means mounted on said head and extending outwardly therefrom for frictional engagement with the tubing, said contact means being positioned at an angle relative to the longitudinal axis of said housing, and means for automatically adjusting the angle of said contact means relative to the housing.

23. A caliper comprising a housing, means mounted on said housing for measuring the maximum of two or more spaced radii at one cross-section of a tubing, means carried by said housing for recording the measurements, and means mounted on said housing for driving said recording means, said driving means including a driving head rotatably mounted on said housing, connecting means between said head and said recording means, contact means mounted on said head and extending outwardly therefrom for frictional engagement with the tubing, said contact means being positioned at an angle relative to the longitudinal axis of said housing, and means for automatically adjusting the angle of said contact means relative to said housing.

24. A caliper adapted to be passed through an extended length of tubing by fluid pressure comprising a housing, means supported by said housing for measuring a plurality of internal diameters of the tubing and for measuring the maximum radial deviation from the measured diameters, recording means supported by said housing for recording the measurements, means mounted on said housing for driving said recording means, and propelling means mounted on said housing adapted to be engaged by fluid passing through the tubing for moving said housing through the tubing.

25. A caliper adapted to be passed through an extended length of tubing by fluid pressure comprising a housing, means supported by said housing for measuring a plurality of internal diameters of the tubing and for measuring the maximum radial deviation from the measured diameters, recording means supported by said housing for recording the measurements, means mounted on said housing for driving said recording means, propelling means mounted on said housing adapted to be engaged by fluid passing through the tubing for moving said housing through the tubing, and means for bypassing a portion of the fluid to prevent the housing from moving through the tubing at an excessive speed.

26. A caliper adapted to be passed through an extended length of tubing by fluid pressure comprising a housing, means supported by said housing for measuring a plurality of internal diameters of the tubing and for measuring the maximum radial deviation from the measured diameters, recording means supported by said housing for recording the measurements, means mounted on said housing for driving said recording means, propelling means mounted on said housing adapted to be engaged by fluid passing through the tubing for moving said housing through the tubing, means for bypassing a portion of the fluid to prevent the housing from moving through the tubing at an excessive speed, and a governor connected to said driving means for regulating said bypassing means in relation to said driving means.

27. A caliper adapted to be passed through an extended length of tubing by fluid pressure comprising a housing, means supported by said housing for measuring the maximum of two or more spaced radii at one cross-section of a tubing, recording means supported by said housing for recording the measurements, means mounted on said housing for driving said recording means, and propelling means mounted on said housing adapted to be engaged by fluid passing through the tubing for moving said housing through the tubing.

28. A caliper adapted to be passed through an extended length of tubing by fluid pressure comprising a housing, means supported by said housing for measuring the maximum of two or more spaced radii at one cross-section of a tubing, recording means supported by said housing for recording the measurements, means mounted on said housing for driving said recording means, propelling means mounted on said housing adapted to be engaged by fluid passing through the tubing for moving said housing through the tubing, and means for by-passing a portion of the fluid to prevent the housing from moving through the tubing at an excessive speed.

29. A caliper adapted to be passed through an extended length of tubing by fluid pressure comprising a housing, means supported by said housing for measuring the maximum of two or more spaced radii at one cross-section of a tubing, recording means supporting by said housing for recording the measurements, means mounted on said housing for driving said recording means, propelling means mounted on said housing adapted to be engaged by fluid passing through the tubing for moving said housing through the tubing, means for by-passing a portion of the fluid to prevent the housing from moving through the tubing at an excessive speed, and a governor connected to said driving means for regulating said by-passing means in relation to said driving means.

30. A caliper adapted to be passed through an extended length of tubing having varying diameters by fluid pressure for measuring and recording the internal configuration of the tubing comprising a housing, means supported by said housing for measuring the internal configuration of the tubing, means supported by said housing for recording the measurements, driving means mounted on said housing for said recording means, said driving means comprising a driving head rotatably mounted on said housing, connecting means between said head and said recording means, contact means mounted on said head extending outwardly therefrom for frictional engagement with the tubing, said contact means being positioned at an angle relative to the longitudinal axis of said housing, means for automatically adjusting the angle of said contact means relative to said housing in accordance with the change in diameter of the tubing, and propelling means secured to said housing adapted to be engaged by fluid passing through the tubing to move said housing through the tubing.

31. A caliper adapted to be passed through an extended length of tubing having varying diameters by fluid pressure for measuring and recording the internal configuration of the tubing comprising a housing, means supported by said housing for measuring the internal configuration of the tubing, means supported by said housing for recording the measurements, driving means mounted on said housing for said recording means, said driving means comprising a driving head rotatably mounted on said housing, connecting means between said head and said recording means, contact means mounted on said head extending outwardly therefrom for frictional engagement with the tubing, said contact means being positioned at an angle relative to the longitudinal axis of said housing, means for automatically adjusting the angle of said contact means relative to said housing in accordance with the change in diameter of the tubing, propelling means secured to said housing adapted to be engaged by fluid passing through the tubing to move said housing through the tubing, and means for by-passing a portion of the fluid to prevent said housing from moving through the tubing at an excessive speed.

32. A caliper adapted to be passed through an extended length of tubing having varying diameters by fluid pressure for measuring and recording the internal configuration of the tubing comprising a housing, means supported by said housing for measuring the internal configuration of the tubing, means supported by said housing for recording the measurements, driving means mounted on said housing for said recording means, said driving means comprising a driving head rotatably mounted on said housing, connecting means between said head and said recording means, contact means mounted on said head extending outwardly therefrom for frictional engagement with the tubing, said contact means being positioned at an angle relative to the longitudinal axis of said housing, means for automatically adjusting the angle of said contact means relative to said housing in accordance with the change in diameter of the tubing, propelling means secured to said housing adapted to be engaged by fluid passing through the tubing to move said housing through the tubing, valve means for by-passing a portion of the fluid to prevent said housing from moving through the tubing at an excessive speed, and a governor connected to said driving means for regulating said valve means in relation to said driving means.

33. A caliper as set forth in claim 32 further including loading wheels carried by the propelling means to control rotation of said housing as the same is passed through the tubing.

34. A caliper adapted to be passed through an extended length of tubing having varying diameters by fluid pressure comprising a housing, means mounted on said housing for measuring a plurality of internal diameters of a tube and for measuring the maximum radial deviation from the measured diameters, means mounted on said housing for recording the measurements, driving means mounted on said housing for driving said recording means including a driving head rotatably mounted on said housing, connecting means between said head and said recording means, contact means mounted on said head and extending outwardly therefrom for frictional engagement with the tubing, said contact means being positioned at an angle relative to the longitudinal axis of said housing, means for automatically adjusting the angle of said contact means relative to said housing in accordance with the changes in diameter of the tubing, and propelling means supported by said housing adapted to be engaged by fluid passing through the tubing for moving said housing through the tubing.

35. A caliper as set forth in claim 34 further including loading wheels to prevent rotation thereof as the same is passed through the tubing.

36. A caliper adapted to be passed through an extended length of tubing having varying diameters by fluid pressure comprising a housing, means mounted on said housing for measuring the maximum of two or more spaced radii at one cross-section of the tubing, means mounted on said housing for recording the measurements, driving means mounted on said housing for driving said recording means including a driving head rotatably mounted on said housing, connecting means between said head and said recording means, contact means mounted on said head and extending outwardly therefrom for frictional engagement with the tubing, said contact means being positioned at an angle relative to the longitudinal axis of said housing, means for automatically adjusting the angle of said contact means relative to said housing in accordance with the changes in diameter of the tubing, and propelling means supported by said housing adapted to be engaged by fluid passing through the tubing for moving said housing through the tubing.

37. A caliper comprising means for measuring a plurality of internal diameters of a tube and for measuring the maximum radial deviation from the measured diameters, said means including a plurality of feelers divided into a plurality of peripherally spaced groups, all groups of feelers being in substantially the same horizontal plane, each group of feelers measuring one segment of the tube, individual means for urging each of said feelers outwardly independently of each other into calipering position, and means for recording the measurements.

References Cited in the file of this patent
UNITED STATES PATENTS

| | | |
|---|---|---|
| 2,150,070 | Kregecz | Mar. 7, 1939 |
| 2,545,102 | Miller | Mar. 13, 1951 |
| 2,766,533 | Brandon | Oct. 16, 1956 |
| 2,771,685 | Kinley | Nov. 27, 1956 |

FOREIGN PATENTS

| | | |
|---|---|---|
| 965,983 | France | Mar. 1, 1950 |